United States Patent [19]

Toyoshi et al.

[11] Patent Number: 4,711,722

[45] Date of Patent: * Dec. 8, 1987

[54] METHOD FOR PREVENTING FOULING OF ELECTRODIALYSIS MEMBRANE

[75] Inventors: Seiji Toyoshi, Saga; Tomoya Yoshizumi, Kawasaki; Masaru Saeki, Fujisawa; Tetsuya Kawakita, Yokohama, all of Japan

[73] Assignee: Ajinomoto Co., Inc., Tokyo, Japan

[*] Notice: The portion of the term of this patent subsequent to Jun. 18, 2002 has been disclaimed.

[21] Appl. No.: 821,882

[22] Filed: Jan. 27, 1986

Related U.S. Application Data

[63] Continuation of Ser. No. 561,570, Dec. 15, 1983, abandoned.

[30] Foreign Application Priority Data

Oct. 12, 1983 [JP] Japan ................................ 58-190193

[51] Int. Cl.$^4$ ............................................ B01D 13/00
[52] U.S. Cl. ................................. 210/638; 204/182.6; 210/639
[58] Field of Search .............. 204/180 P, 301, 180 R, 204/182.6, 183.2; 210/639, 652, 638; 127/54

[56] References Cited

U.S. PATENT DOCUMENTS 4,492,601  1/1985  Nakasone et al. ................. 127/54 X
4,523,999  6/1985  Toyoshi et al. ..................... 210/639

Primary Examiner—Frank Spear
Attorney, Agent, or Firm—Oblon, Fisher, Spivak, McClelland & Maier

[57] ABSTRACT

A method for preventing fouling of an electrodialysis membrane when conducting desalting of an inorganic salt-containing aqueous solution containing electrodialysis membrane-fouling substances, which is characterized by adjusting the pH of the solution to the isoelectric points of the fouling substances.

3 Claims, No Drawings

METHOD FOR PREVENTING FOULING OF ELECTRODIALYSIS MEMBRANE

This application is a continuation of application Ser. No. 561,570 filed Dec. 15, 1983, now abandoned.

BACKGROUND OF THE INVENTION

Description of the Prior Art

This invention relates to an improvement of a de-salting method by electrodialysis.

A method which comprises de-salting e.g. molasses, fermented liquors etc. by electrodialysis in order to effectively utilize sources is well known. Heretofore, it has been known that when an electrodialysis method is applied to these liquors to be treated, ion exchange membranes, especially anion exchange membranes, are fouled, and their useful life is reduced. In order to avoid this drawback, it was necessary to conduct pretreatments, for example, decoloration with active carbon (Seito Gijutsu Kaishi, Vol. 28, p. 15 (1980)), treatment with an anion exchange resin (Japanese Patent Application Laid-open No. 67093/1979) etc. In other words, such treatments involved a number of steps and required expensive auxiliary materials, and as a result, they had a disadvantage of the expensive cost.

This invention presents a novel method for conducting de-salting of a liquor containing anion exchange membrane-fouling substances by electrodialysis without fouling the membranes.

The present inventors have been extensively studying for the purpose of attaining this object, and have come to discover that anion exchange membrane-fouling substances are mostly ampholytic polymers such as proteins, dyes, humic substances etc., and by appropriately adjusting the pH of the liquor, these substances can be converted to a non-charged state and thus the affinity to the membrane can be reduced, thereby having accomplished this invention.

Accordingly, this invention is a method for preventing fouling of an electrodialysis membrane when conducting desalting of an inorganic salt-containing aqueous solution containing electrodialysis membrane-fouling substances such as proteins, dyes, humic substances, etc. by electrodialysis, which is characterized by previously adjusting the pH of the solution to the isoelectric points of said fouling substances or the vicinity thereof.

Examples of the inorganic salt-containing aqueous solution containing electrodialysis membrane-fouling substances such as proteins, dyes, humic substances etc. include molasses such as cane molasses, beet molasses etc. dairy product waste liquors such as cheese whey etc., fermented liquors such as amino acids, nucleic acids etc. and their in-process liquors, protein hydrolysate liquors such as soybean source or its analogs etc.

The electrodialysis in this invention may be conventional in regard to having anion exchange resin membranes and cation exchange resin membranes arranged alternately and in that a voltage gradient is applied. The anion exchange resin membranes to be treated for the prevention of fouling are, for example, conventional anion exchange resin membranes which comprise a polymer having a styrenic backbone provided with a quaternary amine as functional groups, representative examples of this type being AMV (produced by Asahi Glass Co.),
AF-4T, ACH-45T (produced by Tokuyama Soda Co.),
A-101 (produced by Asahi Chemical Industry Co.) etc.

The so-called membrane-fouling substances contained in the aforesaid liquors to be treated are mostly ampholytic polymers such as proteins, dyes, humic substances etc. which can be converted to a non-charged state by adjusting the pH of the liquor to their isoelectric points.

The adjustment of the pH may be made by employing an acid or alkali, examples of the acid which may be employed are mineral acids such as hydrochloric acid, sulfuric acid, nitric acid, phosphoric acid etc. and organic acids such as acetic acid etc., and examples of the alkali include sodium hydroxide, potassium hydroxide, lime, ammonia etc.

Actual operations of this invention are described below.

The isoelectric points of the anion membrane-fouling substances contained in the aforesaid liquors to be treated are all known to be in the range of pH 3-4. According to this invention, it is satisfactory merely to adjust the pH of the aforesaid liquor to be treated with an acid or alkali to pH 3-4 and thereafter conduct desalting by electrodialysis. By this, fouling of the membranes may be prevented by simple operations without employing active carbon or an anion exchange resin.

This invention is described in more detail by the following examples.

EXAMPLE 1

5 kg of cane molasses having Brix 33, 2.5% ashes and pH 5.5 was adjusted to pH 3.5 with hydrochloric acid, and circulated to an electrodialysis cell employing cation exchange resin membranes Selemion CMV (produced by Asahi Glass Co.) and AMV (produced by Asahi Glass Co.) and having an effective membrane surface area of 18 dm$^2$, and an electric current of 1.2 A/dm$^2$ was passed at a temperature of 40° C. for 90 minutes to obtain a de-salted molasses containing 0.2% ashes.

The membranes were washed with water and their electrical resistances were measured, and they exhibited a resistance of 1.1 times that of the unused membranes.

On the other hand, when the molasses was similarly subjected to dialysis but with its original pH 5.5, the membrane resistance after washing with water showed a value of 1.25 times that of the unused membranes.

From the above, it can be clearly seen that when the pH was adjusted to 3.5, the increase in the membrane resistance was small as compared with the non-adjusted case, and the membrane fouling was alleviated.

EXAMPLE 2

Using a glutamic acid fermented liquor mainly starting from cane molasses and having pH 7.8 and a crystallization method liquor obtained by adjusting the pH of the above liquor to pH 3.2 with sulfuric acid and removing the separated glutamic acid, Selemion AMV membranes (produced by Asahi Glass Co.) were dipped in the above liquors respectively at 40° C. for 48 hours, washed thoroughly with water, and the electrical resistance and the ion exchange capacity of each membrane were measured.

The results are shown in Table 1. It can be clearly seen that in the case of pH 3.2, as compared with the case of pH 7.8, the increase in the membrane resistance and the reduction in the exchange capacity are small and the staining of the membranes is low.

TABLE 1

| | Membrane Fouling Index | |
|---|---|---|
| | Membrane Resistance relative to Unused Membranes | Exchange Capacity relative to Unused Membranes |
| pH 7.8 | 1.22 | 0.80 |
| pH 3.2 | 1.07 | 0.89 |

EXAMPLE 3

A liquor (pH 7.4) obtained by subjecting a lysine fermented liquor mainly starting from beet molasses to ultrafiltration treatment using a hollow fiber type ultrafiltration device (manufactured by Asahi Chemical Industry Co., m.w. cut 13,000) and a liquor obtained by adjusting the above ultrafiltration treated liquor to pH 4.0 were measured for the limiting current density (LCD) and the permissible current density (PCD).

As a result, in the case of the liquor of pH 7.4, LCD was 20 A/dm$^2$ and PCD was 18 A/dm$^2$, whereas in the case of the liquor of pH 4.0, LCD was 20 A/dm$^2$ and PCD was 19.5 A/dm$^2$.

LCD and PCD were measured on a compact electrodialysis testing device shown in FIG. 2 described in Japanese Patent Publication No. 34142/1981 under conditions of a temperature of 35° C. and a linear velocity of 5 cm/sec (corresponding to a rotation of 200 rpm) using AMV membranes produced by Asahi Glass Co.

What is claimed is:

1. In a method of preventing fouling of an electrodialysis membrane during desalting by membrane electrodialysis of a fermentation liquor comprising an inorganic salt and an amphoteric electrodialysis membrane fouling substance, wherein the fermentation liquor is obtained from molasses selected from the group consisting of cane molasses and beet molasses, and contains material of isoelectric point within the range of pH 3-4 as the amphoteric electrodialysis membrane fouling substance, the improvement consisting of:
   (a) adjusting the pH of the solution to about the isoelectric point of the fouling substance prior to desalting to produce a pH adjusted fermentation liquor and thereafter,
   (b) subjecting the pH adjusted fermentation liquor retaining the electrodialysis membrane-fouling substances in a non-charged state to the electrodialysis desalting procedure, and
   (c) recovering a desalted fermentation liquor.

2. The process of claim 1, wherein the fouling substance is selected from the group consisting of proteins, dyes and humic substances.

3. The process of claim 1 wherein the fermentation liquor is a glutamic acid fermentation liquor and glutamic acid is separated from the fermentation liquor after the pH adjustment (a) and prior to the desalting procedure (b), while retaining the electrodialysis membrane-fouling substance in the non-charged state in the fermentation liquor.

* * * * *